US004001560B2

United States Statutory Invention Registration [19]

[11] Reg. Number: H1560

[45] Published: Jul. 2, 1996

Gill et al.

[54] CRASH SITE LOCATOR BEACON

[75] Inventors: Robert A. Gill; Robert J. Feldmann, both of Dayton, Ohio

[73] Assignee: The United States of America as represented by the Secretary of the Air Force, Washington, D.C.

[21] Appl. No.: 301,084

[22] Filed: Sep. 6, 1994

[51] Int. Cl.[6] ..... G01S 1/04; B64D 47/06

[52] U.S. Cl. ..... 342/385; 340/981; 441/6; 441/11

[58] Field of Search ..... 340/984, 985; 441/11–13, 16–18, 2, 6, 20; 455/40, 38.1, 38.2, 38.3, 66, 68, 69, 70, 83, 88, 127, 128, 90, 89, 343, 344, 347, 351; 33/366

[56] References Cited

U.S. PATENT DOCUMENTS

| | | | |
|---|---|---|---|
| 2,441,133 | 5/1948 | Brady | 455/128 |
| 3,092,822 | 6/1963 | Dorman | 441/12 |
| 3,431,568 | 3/1969 | Brown | 441/6 |
| 3,981,036 | 9/1976 | Higgs | 441/2 |
| 4,186,374 | 1/1980 | Ouellette | 441/11 |
| 4,464,129 | 8/1984 | Vancheri et al. | 340/984 |
| 4,654,977 | 4/1987 | Pakus | 33/366 |
| 4,763,126 | 8/1988 | Jawetz | 340/895 |
| 4,888,595 | 12/1989 | Friedman | 342/457 |
| 4,933,963 | 6/1990 | Sato et al. | 455/127 |
| 4,964,121 | 10/1990 | Moore | 455/343 |
| 4,981,453 | 1/1991 | Krishan et al. | 441/6 |
| 5,033,111 | 7/1991 | Marui | 455/127 |
| 5,218,366 | 6/1993 | Cardamone et al. | 342/385 |
| 5,226,061 | 7/1993 | Van Der Veen | 375/68 |
| 5,299,227 | 3/1994 | Rose | 375/1 |
| 5,309,153 | 5/1994 | Gaskill et al. | 455/38.2 |

OTHER PUBLICATIONS

Subil Enterprises, Inc., The Fly–By–Night, m/n B87–3R.

*Primary Examiner*—Bernarr E. Gregory
*Attorney, Agent, or Firm*—Gerald B. Hollins; Thomas L. Kundert

[57] ABSTRACT

The Locator Beacon (LB) is an 18 inch diameter hemispherical unit designed to be air dropped via parachute from a search aircraft near an aircraft crash site. The LB is self uprighting when it lands on the ground and its antenna is always oriented for maximum efficiency. When activated, the LB sends out a radio frequency signal on 121.6 Mhz and 243.2 Mhz, this signal can be tracked by aircraft or by ground parties equipped with directional locating equipment. The LB also contains a strobe light beacon to aid in visual acquisition of the unit. The LB remains in the active (broadcast) mode for approximately 20 minutes before resetting itself to the listening mode. External VHF activation of the LB repeats the LB broadcast and strobe light cycle for another 20 minutes.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CRASH SITE LOCATOR BEACON

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a crash site locator beacon.

The Alaska Air National Guard has an ongoing need for a way to mark an aircraft crash site from the air so that recovery personnel can locate the site at some later time. The Air Guard search aircraft can define navigational coordinates of the crash site based upon its onboard navigation systems, but the recovery team may have to use a small helicopter, light aircraft, or ground transportation to reach the crash site and these vehicles are not normally equipped with similar navigational systems that afford the accuracy and resolution necessary to locate the crash site based upon the coordinates passed to them.

The following United States patents are of interest.

5,299,227 - Rose 5,226,061 - Van der Veen 5,218,366 - Cardamone et al 4,888,595 - Friedman None of the cited patents disclose a self uprighting 18 inch diameter hemisphere crash site locator beacon which is air droppable onto land. The patent to Cardamone et al discloses a water proof radio beacon. The patent to Friedman discloses a radio transmitter that identifies the type of aircraft to which it is attached. The patents to Van der Veen and Rose disclose small light weight radio transmitters for tracking soldiers or animals.

SUMMARY OF THE INVENTION

An objective of the invention is to provide an improved beacon to mark a crash site, to facilitate recovery of equipment or personnel.

The invention relates to a Crash Site Locator Beacon (LB) which is an 18 inch diameter hemispherical unit designed to be air dropped via parachute from a search aircraft near an aircraft crash site. The LB is self uprighting when it lands on the ground and its antenna is always oriented for maximum efficiency. When activated, the LB sends out a radio frequency on 121.6 Mhz and 243.2 Mhz which can be tracked by aircraft or by ground parties equipped with directional locating equipment. The LB also contains a strobe light beacon to aid in visual acquisition of the unit. The LB remains in the active (broadcast) mode for approximately 20 minutes before resetting itself to the listening mode. External VHF activation of the LB repeats the LB broadcast and strobe light cycle for another 20 minutes.

DETAILED DESCRIPTION

A prototype Crash Site Locator Beacon (LB) to mark aircraft crash sites has been designed and built. The unit is designed to be air dropped via parachute from a search aircraft, to right itself upon landing, and to activate a radio frequency (rf) beacon and a high intensity strobe light upon command. A recovery vehicle can activate the LB with a very high frequency (VHF) radio transmission and can "home in" on its location using VHF or ultra high frequency (UHF) automatic direction finding (ADF) equipment. The strobe light visually aids the recovery personnel in locating the LB. The LB is also designed to float should it land in marshlands or shallow water.

Figure 1:
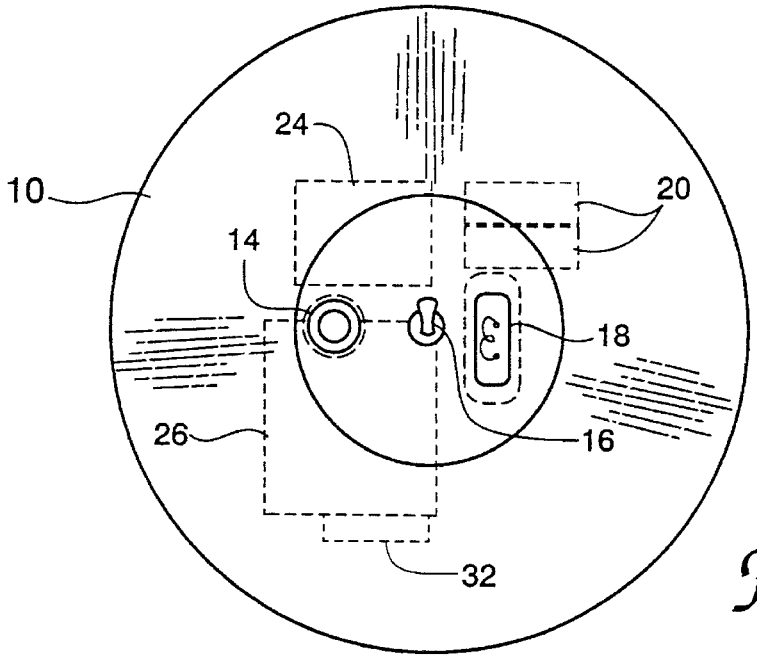
FIG. 1 is a top view of the Locator Beacon.
Figure 2:
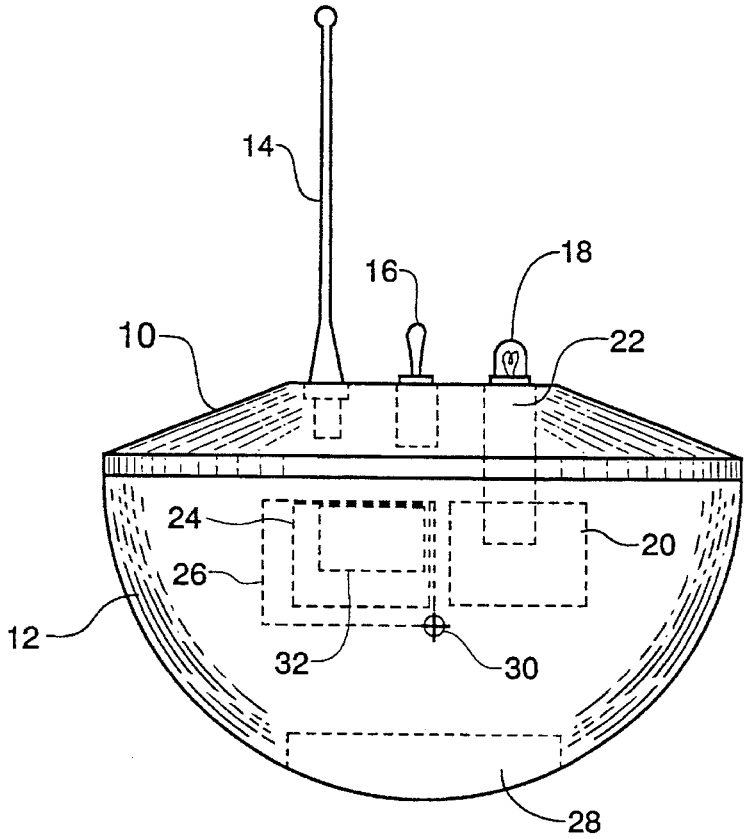
FIG. 2 is side view.
Figure 3:
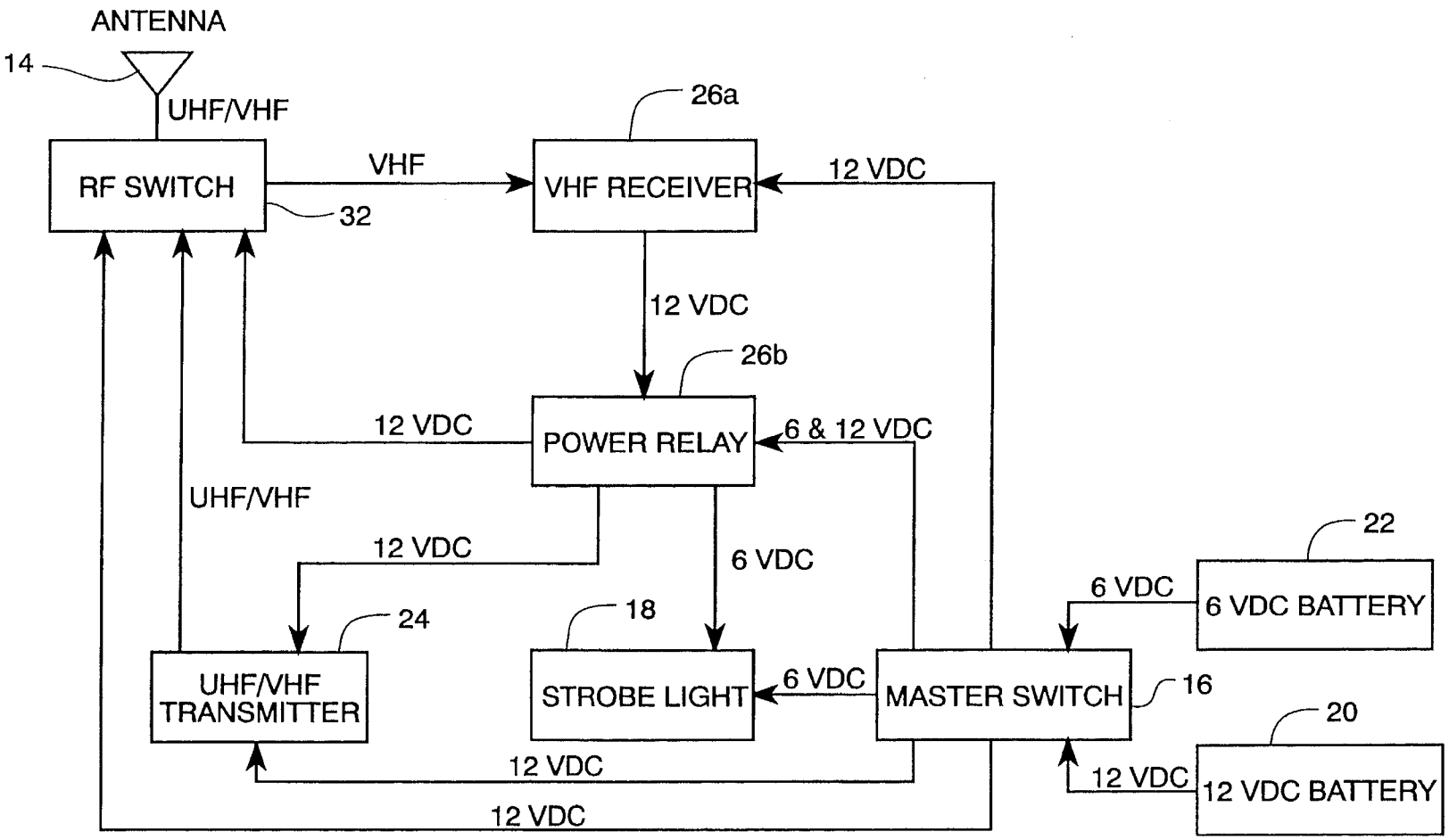
FIG. 3 is an electrical block diagram.
Figure 4:
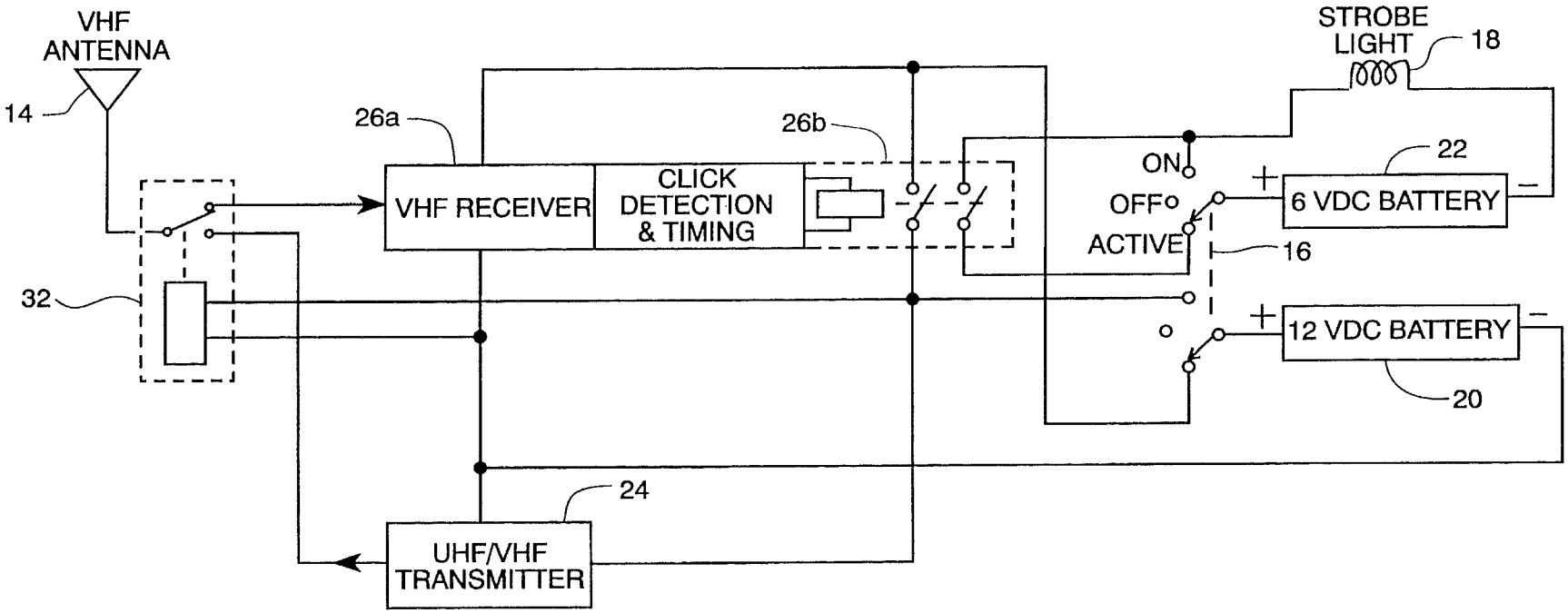
FIG. 4 is a wiring diagram.

FIG. 1 is a top view of the Locator Beacon, FIG. 2 is side view, FIG. 3 is an electrical block diagram, and FIG. 4 is a wiring diagram showing details of the connections to the switch and relays. (The application as filed also include one color photo showing the Locator Beacon held by applicants, and another color photo showing the Locator Beacon dropping by parachute).

The LB is designed to be a rugged unit, simple to operate and maintain. It is made from commercially available components and the long life batteries used to power the unit are readily obtainable through Federal Stock sources. The unit is easily transportable by one person with no special handling required. The LB is an 18 inch diameter aluminum hemisphere 12 with a strobe light bulb/lens 18, a 20" long rf antenna 14, and a three position mode Select Switch 16 mounted on a six-inch diameter upper flat surface of the top 10. The top 10 also has a sloping surface providing a one and one half inch vertical distance from the upper surface to the hemisphere 12. The shell of the LB is 0.060-inch thick 6061-T4 spun aluminum and it contains five subunits packed in foam rubber and Foamsafe packing material. The natural aluminum colored LB weighs approximately 15 pounds. The five subunits within the LB are described below:

VHF Receiver/Power Relay - This subunit 26 consists of a small VHF receiver **26*a* (FIG. 3) tuned to 123.40 Mhz and a double pole relay 26*b*. When the LB Mode Select Switch 16 is in the ACTIVE position, the VHF receiver 26*a* is on. The VHF receiver is activated by three exterior rf carrier pulses or "clicks" which engages the double pole relay 26*b* thus allowing battery power to go the VHF/UHF Transmitter 24, the RF Antenna Switch 30, and the Strobe Light 18. Each of the activation clicks needs to be sustained for several seconds. The subunit's double pole relay 26*b* disengages after approximately 20 minutes and the subunit 26 is reset to the listening (receive) mode. The LB can be reactivated with three more clicks on 123.40 Mhz. The subunit 26 has only one adjustment, a potentiometer which adjusts the VHF receiver's sensitivity to the incoming clicks. This potentiometer is reached through a small opening on the side of the subunit 26 and a counterclockwise motion increases VHF receiver sensitivity. However, increasing the sensitivity of the VHF receiver 26*a*** also increases the likelihood that the system will be activated by random static.

The VHF Receiver/Power Relay subunit 26 was obtained from Subil Enterprises, Inc., 4128 East 25th Street, Des Moines, Iowa 50317, with a type number M/N BB7-3R. As shown in FIG. 4, it includes click detection and timing circuits for activating and releasing the relay **26*b***. The relay has two sets of contacts, which are normally open and rated at one ampere.

VHF/UHF Transmitter - This subunit 24 consists of a small, dual channel transmitter broadcasting a continuous one second sweeping tone on 121.60 Mhz and 243.2 Mhz.

The subunit 24 is activated continuously when the LB Mode Select Switch 16 is placed in the ON position or for approximately 20 minutes when the LB Mode Select Switch 16 is placed in the ACTIVE position and the VHF Receiver/Relay 26 and the VHF Receiver/Relay 26 has been activated by three clicks on 123.40 Mhz. There is a three position switch (not shown) on the subunit 24 which allows the transmitter to be turned on if required, however this switch must be in the ON position for the LB to function properly. The third switch·position (ARMED) is not used and if the switch is placed in this position, the transmitter will not function.

RF Antenna Switch - This subunit 32 consists of a single pole double throw rf coaxial switch which connects the VHF Receiver/Relay 26 and the VHF/UHF Transmitter 24 to a single rf antenna 14. The single rf antenna 14 is normally connected to the VHF Receiver/Relay 26 through the RF Antenna Switch 32 so that the VHF Receiver/Relay 26 can listen for three activation clicks on 123.4) Mhz. When three clicks are detected the VHF Receiver/Relay 26, the RF Antenna Switch 32 disconnects the VHF Receiver/Relay 26 and connects the single antenna 14 to the VHF/UHF Transmitter 24 which broadcasts the RF homing signal on 121.60 Mhz and 243.2 Mhz. The RF Antenna Switch 32 isolates the transmitted homing signal from the VHF Receiver/Relay 26 and precludes any electromagnetic interference. After approximately 20 minutes the RF Antenna Switch 32 disconnects the VHF/UHF Transmitter 24 from the single rf antenna 14 and connects the single rf antenna 14 to the VHF Receiver/Relay 26 once again.

Strobe Light - This subunit 18 consists of a single high intensity white strobe light which flashes approximately 60 times per minute. The subunit 18 is activated continuously when the LB Mode Select Switch 16 is placed in the ON position or the subunit 18 is activated for approximately 20 minutes when the LB Mode Select Switch 16 is placed in the ACTIVE position and the VHF Receiver/Relay 26 is activated by three clicks on 123.40 Mhz. The subunit 18 is powered by a single six volt mercury battery 22 which screws into the base of the subunit 18.

Battery Pack - This subunit 20 consists of two 12-volt lithium sulfur dioxide batteries which are connected in parallel. These batteries provide power through the LB Mode Select Switch 16 to all of the subunits except the Strobe Light 18.

The master or mode switch 16, as shown in FIG. 4, is a three position double throw switch. The center position is OFF. The upper position (as shown in FIG. 4) is on or continuous, with the upper lever connecting the 6-volt battery 22 to the strobe light 18, and the lower lever connecting the 12-volt battery 20 to the transmitter 24 and to the rf relay 32, for continuous transmission. The lower position is ACTIVE, with the upper lever connecting the 6-volt battery 22 via one set of contacts of the relay **26*b* to the strobe light 18, and the lower lever connecting the 12-volt battery 20 to the receiver 26*b*, and via the other set of contacts of the relay 26*b* to the transmitter 24 and the rf relay 32**.

CRASH SITE LOCATOR BEACON SELF RIGHTING MECHANISM

The mechanism for righting (i.e., causing the LB to remain upright with its antenna perpendicular to the ground plane) the Crash Site Locator Beacon is the hemispherical shape of the beacon package and the location of its center of gravity (c.g.) 30 (FIG. 2). There are only two statically stable positions for the beacon's hemispherical shape and c.g. 30 location: (1) with the curved side down in contact with the ground and the antenna perpendicular to the ground plane and (2) with the flat side in direct contract with the ground and the curved side facing upward. The second condition is unlikely since the beacon is dropped by a parachute attached to the flat side of the beacon and gravity causes the curved side to face downward; thus it makes initial contact with the ground. Further, aerodynamically the curved surface of the beacon is dynamically more stable during the parachute fall through the air. Should the beacon land at some acute angle to the upright position, the center of gravity 30 of the beacon will create a torque about the contact point causing the beacon to seek the fully upright position. The low c.g. position within the beacon was created by mounting the components as low as possible in the hemisphere and adding two to three pounds of liquid metal ballast 28 at the lowest possible location within the beacon.

OPERATION

The locator beacon (LB) requires no special handling and may be stored within a search and rescue aircraft for an extended period of time with the LB Mode Select Switch 16 in the OFF position. However, as with other battery powered devices, LB operation is dependent upon battery condition and capacity. Therefore periodic replacement of the batteries may be required after extended storage or usage.

Subunit Tests. - Placing the LB Mode Select Switch 16 in the ON position causes the VHF/UHF Transmitter 24, the RF Antenna Switch 32, and the Strobe Light 18 subunits to activate. An observer with an rf receiver tuned to 121.60 Mhz or 243.2 Mhz will hear a continuous sweeping tone and see the strobe light 18 pulsing. This will continue until the LB Mode Select Switch 16 is placed in the OFF position. Placing the LB Mode Select Switch 16 in the ON position does not test the operation of the VHF/Relay subunit 26. This subunit 26 can only be tested by placing the LB Mode Select Switch 16 in the ACTIVE position and using a rf transmitter on 123.40 mhz to pulse the LB three times to activate the whole unit. The LB will then send out the 121.60 Mhz and 243.2 Mhz sweeping tone and the strobe light 18 will pulse for approximately 20 minutes.

Airdrop - The LB is attached to a Type G-8 or M390 A/B aerial delivery parachute via two attachment fittings on the top of the unit. The static line of the parachute is secured to the aircraft and the LB/parachute is ejected over the crash site by an air crew member through an open door of the search aircraft. Prior to dropping the unit, the LB Mode Select Switch 16 must be placed in the ACTIVE position. If possible the LB should be activated by three clicks on 123.40 Mhz prior to the drop. Continued LB operation during aircraft ejection and ground impact will assure the search aircraft crew that the unit is operating properly.

Activation - The LB is activated by three sustained pulses or clicks of carrier frequency power on 123.40 Mhz from a rf transmitter. Depending on transmitter power, antenna type/location, and range; the LB may be activated at a line of sight range up to 32 miles away. The clicks should be of at least one second duration and at least one second in separation. If the LB had been in the OFF mode or the ON mode for testing, allow at least two minutes to pass with the unit in the ACTIVE mode before attempting the three clicks. If less time occurs, as many as eight clicks may be required to activate the unit. Once the LB UHF/VHF Transmitter 24 is activated, the unit will broadcast on 121.60 Mhz and 243.2 Mhz for approximately 20 minutes. It is not possible to extend the LB transmission beyond the 20 minutes with additional clicks on 121.40 Mhz because the LB rf antenna is disconnected from the VHF Receiver/Relay subunit 26. When the LB has ceased broadcasting after approximately 20 minutes, three additional clicks on 121.40 Mhz will repeat the LB broadcast cycle.

Reception - The LB UHF/VHF Transmitter subunit 24 is based upon a low power emergency locator transmitter and broadcast on 121.60 Mhz and 243.20 Mhz. Depending upon rf receiver sensitivity, antenna type/location, and range; the LB transmitted signal should be able to be distinguished at a distance equal to or greater than the range the LB was activated. The rf receiver's sensitivity can be greatly enhanced by turning its automatic squelch function off and/or turning its manual squelch to minimum. The ADF unit can be directly tuned to 121.6 Mhz or 243.20 Mhz for direction finding on the LB. The LB power transmitted on 121.50 Mhz and 243.00 Mhz is less than -60dB of the LB power transmitted on 121.60 Mhz and 243.20 Mhz.

Recovery - The LB Mode Select Switch 16 should be placed in the OFF position by the crash site recovery ground team to preclude further power drain of the LB batteries. The parachute should be detached from the LB attachment fittings and the unit examined for external damage. If there is no significant external damage and a subunit test shows the LB to be functional, the LB can be readied for further use. Battery replacement may be required if the LB was required to be in the active receive mode for a minimum of 10 days (32 broadcast cycles). For example, if the LB has been in the receive mode for 5 days, approximately one half of the 12 volt lithium battery life will be exhausted and the LB will only be capable of operating in the active transmit mode for 5 hours continuously (or 15 broadcast cycles) .

MAINTENANCE

The LB does not require any specific maintenance other than possible battery replacement (both the 12-volt lithium and the six-volt mercury batteries) prior to use. Battery replacement requires disassembly of the LB unit in order to access the two different battery types.

Disassembly - The subunits of the LB are accessed by removing the top aluminum plate 10 from the lower aluminum hemisphere 12. This is accomplished by removing 12 metal screws around the top rim of the aluminum hemisphere and then lifting the top aluminum plate approximately eight inches upward. This will allow access to the wiring harness and antenna cable which can then be disconnected from the Mode Select Switch 16, the Strobe Light 18, and the rf antenna 14. Once these have been disconnected, the top aluminum plate 10 can be completely removed and set aside. The lower aluminum hemisphere 12 contains the VHF Receiver/Relay 26, UHF/VHF Transmitter 24, RF Antenna Switch 32, and Battery Pack subunits 20 and 22 nestled in foam packing material. Each subunit can be removed and disconnected from the wiring harness for adjustment or replacement. The Strobe Light 18 is attached to the top aluminum plate 10 and its six-volt battery 22 is removed by unscrewing it from the bottom of the Strobe Light subunit 18.

Subunit repair - There are no field level repairs that can be made to the internal components of the subunits. In case of subunit failure it is recommended that the subunit be replaced or sent back to the manufacturer for repair. Prior to doing this, the wiring harness and connectors should be checked for continuity.

Aluminum Shell Repair - Large dents to the aluminum shell may be repaired by disassembling the LB and removing all the subunits. The foam packing material can then be moved aside and large wooden dowel used to pound out the dent from the inside.

Assembly - Following careful placement of the subunits in the foam packing material in the lower aluminum hemisphere 12, the wiring harness should then be connected to these subunits. The top cover of foam packing material should then be placed over the bottom aluminum hemisphere 12. The top aluminum plate 10 should then be placed approximately eight inches over the bottom aluminum hemisphere 12 and the wiring harness and rf antenna cable connected to the Mode Select Switch 16, the Strobe Light 18, and the rf antenna 14. The top should then be lowered onto the bottom hemisphere making sure the Strobe Light subunit 18 fits into the slot provided for it in the lower hemisphere. It is recommended that a subunit test be accomplished at this time to ensure the wiring connections are correct. The LB assembly is completed by inserting and tightening the 12 metal screws around the top rim of the unit. Because of the multiple screw holes, the LB is not water tight but may be made so by covering the rim and screws with a piece of wide, waterproof tape. It is recommended that a water proof covering be placed over the Mode Select Switch 16 since water can enter the LB through the switch toggle mechanism.

ADVANTAGES AND NEW FEATURES

Present rf beacons used to mark aircraft crash sites are simple, continuous transmitter units. They are activated by a crew member prior to being dropped from the search aircraft and transmit continuously until their battery runs down. These units do not contain a strobe light and are not designed to remain in an upright position when they land. Therefore, their rf antenna is not positioned for maximum pattern efficiency and under some conditions may not transmit a usable beacon signal at all. The LB is designed to always position the rf antenna in optimum position for maximum transmitter range. The externally commanded 20 minute broadcast cycle can be initiated by the recovery team up to ten days after the unit is dropped from the search aircraft. Therefore, it is unnecessary for the search aircraft to relocate a crash site immediately because of weather or extreme distance.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

We claim:

1. A radio beacon unit comprising: radio electronics contained in a housing and an external antenna designed to be air dropped via parachute;

wherein the housing comprises: a top portion having a flat upper surface, and a bottom portion having a hemispherical lower surface, with said antenna mounted on said upper surface perpendicular thereto, means for providing a relatively low center of gravity, so that when the beacon unit is in any position on the hemispherical lower surface the beacon unit will upright itself so that the antenna is oriented for maximum efficiency;

wherein said radio beacon unit is a locator beacon which has mounted inside said housing a first subunit comprising a receiver and a power relay, a second subunit comprising a transmitter for sending radio signals on given frequencies so that the radio beacon unit can be tracked with directional locating equipment, a third subunit comprising an RF antenna switch which normally connects the antenna to the receiver, and a fourth subunit comprising a main battery pack;

a mode switch mounted on said upper surface, said mode switch having an OFF position in which the main battery pack is disconnected, and an ACTIVE position in which the main battery pack is connected to the receiver and to a first terminal of the power relay in the first subunit;

wherein the first subunit includes means for detecting a given number of RF pulses received via said antenna and in response thereto activating the power relay to extend the connection of the main battery pack from said first terminal to the second and third subunits, so the transmitter and the RF antenna switch are activated to transmit a beacon signal and to disconnect the receiver from the antenna;

wherein the first subunit further includes timing means to deactivate the power relay after a given period of time, to thereby disconnect the transmitter and RF antenna switch from the main battery pack, and to reconnect the receiver via the RF antenna switch to the antenna so that further RF pulses can be detected.

2. A radio beacon unit according to claim 1, wherein said top portion includes a sloping surface connecting the upper surface to an outer rim at the top of the bottom portion; and wherein the radio beacon unit further includes a strobe light mounted on said upper surface, a strobe-light battery pack, wherein said mode switch has first and second poles, with the first pole in the ACTIVE position providing said connection of the main battery pack to the receiver and to said first terminal, and the second pole connecting the strobe-light battery pack to a second terminal of the power relay, so that when the power relay is activated the strobe light is energized.

* * * * *